US00RE45281E

(19) United States
(12) Reissued Patent
Erb et al.

(10) Patent Number: US RE45,281 E
(45) Date of Reissued Patent: Dec. 9, 2014

(54) DYNAMIC FURNITURE

(75) Inventors: Scott C. Erb, Alexandria, VA (US); Mark M. Erb, Alexandria, VA (US)

(73) Assignee: Exciting Inc., Alexandria, VA (US)

(21) Appl. No.: 13/507,810

(22) Filed: Jul. 31, 2012

Related U.S. Patent Documents

Reissue of:
(64) Patent No.: 7,850,238
Issued: Dec. 14, 2010
Appl. No.: 11/879,144
Filed: Jul. 16, 2007

(51) Int. Cl.
*A47C 1/12* (2006.01)

(52) U.S. Cl.
USPC ..... 297/321; 297/325; 297/327; 297/354.13

(58) Field of Classification Search
USPC ..... 397/320, 354.11, 321, 340, 325, 327, 397/354.12, 354.13, 313, 354.1
See application file for complete search history.

(56) References Cited

U.S. PATENT DOCUMENTS

| | | | | |
|---|---|---|---|---|
| 2,616,484 | A * | 11/1952 | Christie | 297/320 |
| 3,315,666 | A | 4/1967 | Sellner | |
| 3,641,995 | A * | 2/1972 | Brandt | 601/26 |
| 3,761,081 | A | 9/1973 | Simmons | |
| 4,790,599 | A | 12/1988 | Goldman | |
| 5,098,158 | A | 3/1992 | Palarski | |
| 5,486,035 | A * | 1/1996 | Koepke et al. | 297/320 |
| 6,050,642 | A | 4/2000 | Erb | |
| 6,435,611 | B1 | 8/2002 | Walter | |
| 6,644,743 | B1 * | 11/2003 | Lin | 297/320 |

* cited by examiner

*Primary Examiner* — Anthony D Barfield
(74) *Attorney, Agent, or Firm* — Greenblum & Bernstein P.L.C.

(57) ABSTRACT

Dynamic furniture having platforms in dynamic attachment to an actuator assembly that in turn is in dynamic attachment to a base. Use of motional platforms supported by a motional actuator assembly permits an article of the furniture to conform to the many and varied body positions a user wants, and allows a user to more easily change body positions while remaining within the furniture, and in medical scenarios may obviate most needs to transfer a patient from one article of furniture to another.

8 Claims, 17 Drawing Sheets

DYNAMIC FURNITURE

Matter enclosed in heavy brackets [ ] appears in the original patent but forms no part of this reissue specification; matter printed in italics indicates the additions made by reissue.

FIELD OF THE INVENTION

The present invention relates to the field of human supports and more specifically to the field of adjustable, therapeutic furniture commonly known as recliners.

BACKGROUND

Furniture possesses many uses. Without delving deeply into the history of furniture, there have evolved two primary classes of furniture dedicated to supporting a human in repose: beds and chairs. Beds are designed to accommodate a human lying generally flat, and chairs are adapted to accommodate a more contorted, seated human body arrangement. Although recliners exist that allow multiple positions, such recliners have inherent drawbacks: for example, a user is either in one of the preset reclining positions, or is in an unstable in-between state; and often a user cannot flex his back beyond an angle of 180 degrees.

There is a need for a single article of furniture that can adjust to the many positions of human repose, rather than limited specific preset positions. Of particular interest, are medical patients having mobility issues. It is often the case that a patient has an issue standing, lying down, or even moving from one article of furniture to another. The problem becomes further complicated when moving a patient into or from one article of furniture to another becomes inherently destructive to the patient's health. Current furniture is either functionally insufficient, or overly complicated and specialized.

Although simple furniture suitable to accommodate a human in various states of repose is a rare find, other devices with highly adjustable body members suitable to greatly alter the configuration of a human do exist. Such devices tend to include exercise equipment. For example, in U.S. Pat. No. 6,435,611 there is disclosed an exercise device having two body supports which move in similar rotation and inverse elevation to one another to change from a chair configuration, where one support is higher than the other, to a spine tensioning apparatus, where the supports are near equal in elevation. Preferably body supports are spaced apart from one another such that the only interconnecting human link between the two supports, when in a near equal elevation configuration, is the human spine. The spine, in this configuration is then subjected to similar forces as a simple beam supported by two separate forces, tension, compression, shear and moment. The spine is aided by and through tension and contraction and increased blood flow and afforded the ability for spinal muscle, nerve and soft tissue development and maintenance. The supports, independent of each other, comprise an upper body support and a lower body support and allow an individual's body to practice spine enhancement, development, & or traction, lying or any combination thereof, or alternately, face up, face down, or on either left or right side. The apparatus is also applicable to retrofitting existing chairs.

Although this exercise device includes two rotatable platforms which allow a significant degree of freedom of motion to the user, its primary purpose is to tension a spine rather than to support a human in various states of repose. Adapted to provide spinal tension rather than body support, this exercise device's body support platforms are purposefully static internally and limited to circularly-rotating platforms. The body supports are not dynamically motionable to allow changing into different positions of repose while the user remains within the furniture.

Therefore there is a need for a single article of furniture designed to allow a user to occupy multiple states of repose and to easily reach those states of repose without having to leave and reenter the furniture.

SUMMARY

The dynamic furniture of the present invention is designed to cooperate with the user to facilitate achieving countless seating positions—including the standing, lying, and inverted body positions. A user, which can be either the individual occupying the device or an attendant acting externally, can easily transition between the many positions the body can achieve. It solves many of the problems associated with previous articles of furniture, including: difficult or unsafe entrance into and out of a chair, difficult or unsafe entrance to or from bed; difficult transition between lying, sitting, and standing; and the ability of the user to easily change body position and angle of repose in order to minimize the ill effects of remaining in a relatively fixed position within the furniture for any length of time. The present invention will help a person transition from standing, to sitting, to reclining, to lying flat and more; and the user can experience the therapeutic motions between positions. The addition of locking controls allows a user enhanced manipulation with respect to position maintenence. Significantly, the user can flex his or her back in many angles of repose.

The present invention is directed to dynamic furniture for supporting a seated, standing, or reclining user in a home, office, medical facility, mass transport vehicle, mobile platform, or other location where the aspects of the present invention would be advantageous. The furniture includes a base, an actuator, a seat platform, and a back platform. The base acts to support the present invention and includes a portion adapted to contact a stable surface such as a floor, wall, ceiling, or mobile platform. The preferred base is a substantially flat plate with space to attach two rotatable connectors, though the base can be a curved plate or other shape as needed for other specific purposes—such as rocking or tilting. One or more path-joint assemblies connect the base to an actuator in such a manner as to permit the actuator assembly to move along a specific path relative to the base. The actuator in turn holds dynamic scat platform and dynamic back platform with separate, independent path-joint assemblies.

For reference purposes, it is helpful to discuss the actuator assembly in terms of a proximate portion and a distal portion. The proximate portion of the actuator assembly normally holds the seat platform and the distal portion of the actuator holds the back platform, as though one were facing the seat portion of a chair. The terms "seat" and "back" when used in conjunction with a platform correspond to the seat and back portions of the body of a user. The back platform normally contacts an upper portion of a human body, and the seat platform normally contacts a lower portion of a human body—though they can be reversed or used otherwise. In other embodiments of the present invention there are also leg rests, head rest, and other platforms connected.

The seat platform is attached to the actuator assembly in a manner that allows the seat platform to travel along a specific path relative to the actuator assembly. The back platform is attached to the actuator assembly in a manner that allows the back platform to move along a specific path relative to the actuator assembly. Preferred platforms are essentially panels, which may be flat or from slightly to moderately curved, sized to accept the various parts of the body for which the panel would be used.

The paths, as allowed by the path joints of the present invention, between components of the furniture include circular orbits and excentric orbits. A circular orbit occurs between two components when a path joint assembly restricts the motion of a first component to include only a uniform, substantially-circular motion relative to the second component. An excentric orbit occurs between two components when a path joint assembly allows the motion of a first component to include a non-uniform motion relative to the second component such that a non-circular path is allowed. By "orbit" it is meant that a component moves in relation to a second component due to one or more axes of restrained connection. The paths of the present invention need not be confined to two-dimensional motion, but may further include motion within a third-dimension.

It is an aspect of the present invention to provide a comfortable article of furniture that is relatively simple to enter and exit.

It is a further aspect of the present invention to provide an article of furniture that is relatively simple to manufacture, operate, and maintain.

It is also a further aspect of the present invention to provide an article of furniture that dynamically moves with the body of a user into the many desired states of repose, and can be moved by the user or an attendant to reposition the body of a seated user.

It is a still further aspect of the present invention to provide an article of furniture capable of achieving angles beyond 180 degrees.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description and accompanying drawings.

DETAILED DESCRIPTION

Figure 1:
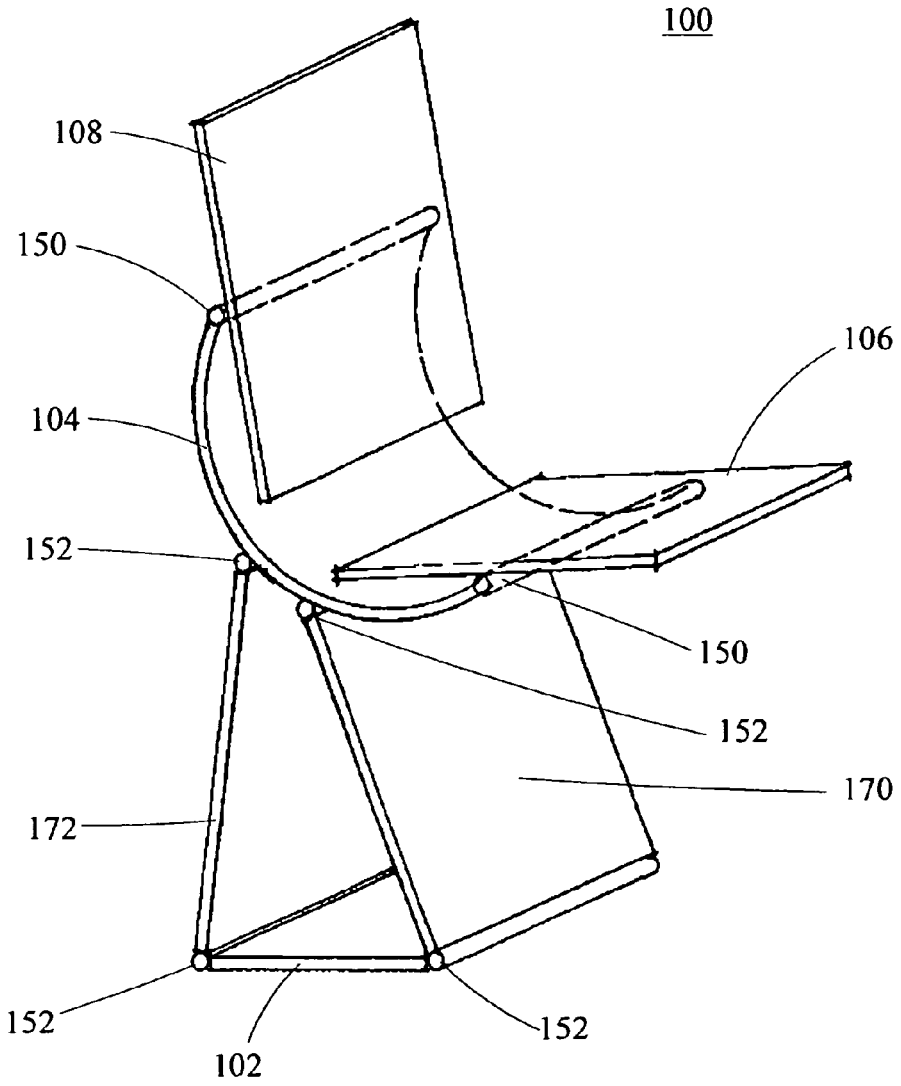
FIG. 1 is a perspective view of an embodiment of the dynamic furniture.

Referring first to FIG. 1, an embodiment of the dynamic furniture 100 is shown. The dynamic furniture 100 includes a base 102 which is located in a position to support the dynamic furniture 100. There is no preferred shape or construction for such a purpose and the base 102 shown in FIG. 1 illustrates a configuration readily amenable to home and office use having a rectangular floor contact. As the base 102 must support the weight of a human being, often in motion within the present invention, the base 102 should be constructed of sturdy material. Examples of materials sufficient with the present invention include wood, metals, plastics, and composites having sufficient strength to accept component wear. Other base configurations will suit the present invention; however, the dynamic furniture 100 of FIG. 1 shows the preferred base 102 adapted to sit on the floor in a stable manner.

It is necessary for base 102 to support the actuator 104 while the actuator 104 is permitted to move only along a specific path with respect to the base 102. For the embodiment shown in FIG. 1, the actuator 104 is a curved plate and its path of movement is determined by the path-joint assembly which connects actuator assembly 104 to base 102. The preferred embodiment of path-joint assembly for the curved actuator assembly 104, as shown in FIG. 1, incorporates the base 102 to the actuator assembly by means of a double-member excentric path joint assembly. The path-joint assembly includes front boom 170, and a rear boom 172 that, in conjunction with the four rotatable connectors 152, join the base 102 to the actuator assembly 104. The front boom 170 has one of its sides circularly rotatably connected to a proximate portion of the actuator assembly 104; and also the front boom 170 has its opposite side circularly rotatably connected to a proximate portion of the base 102. A rear boom 172 similarly has one of its sides circularly rotatably connected to a distal portion of the actuator assembly 104, and the rear boom 172 has its opposite side circularly rotatably connected to the other end of the base 102. The path-joint assembly depicted in FIG. 1 permits the actuator assembly 104 to tilt back and forth into various positions along an excentric path relative to the base 102. The actuator assembly 104 need not be shaped like the curved plate shown in FIG. 1, and can include one or more curved bars, one or more straight bars, or other shapes and configurations capable of dynamically holding motionable platforms. A back platform 108 contacts an upper portion of a human body, and the seat platform 106 contacts a lower portion of a human body—though they can be reversed or used otherwise.

Figure 2:
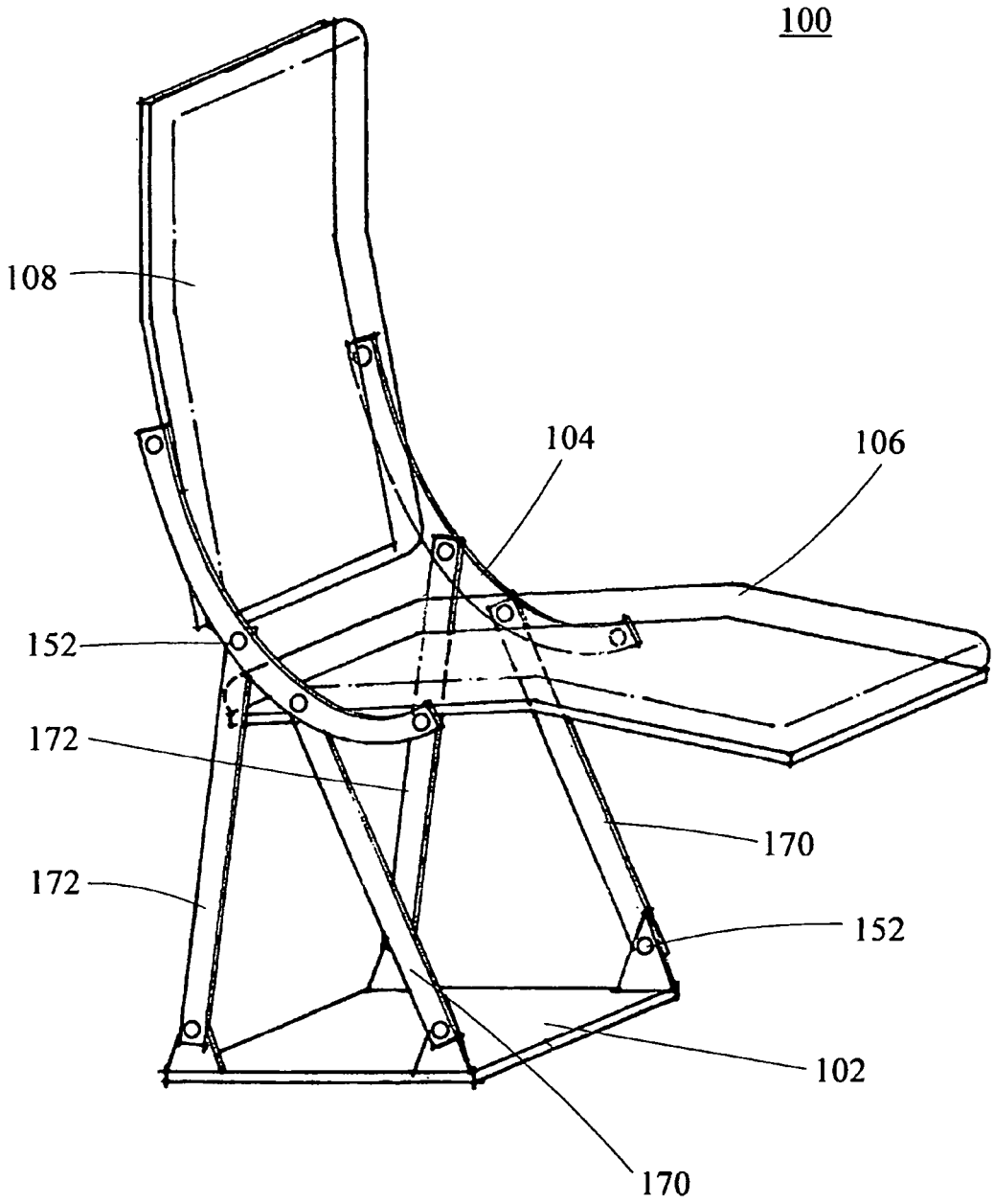
FIG. 2 is a perspective view of an embodiment of the dynamic furniture.
Figure 3:
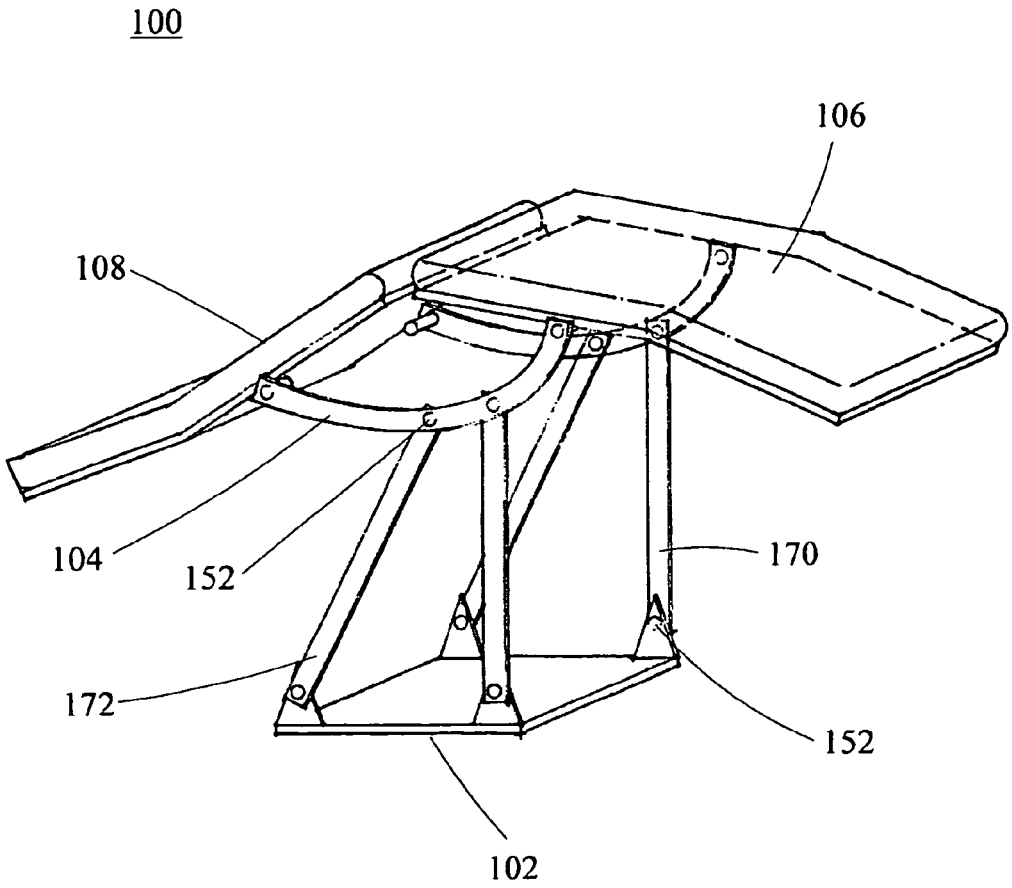
FIG. 3 is a perspective view of an embodiment of the dynamic furniture.

FIG. 2 and FIG. 3 disclose two positions of an embodiment of the dynamic furniture 100 with the seat platform 106 sized and shaped to accept a user's butt and legs, and the back platform 108 sized and shaped to accept the user's back and head. FIG. 2 and FIG. 3 each also show the dynamic furniture 100 with curved actuators 104, and with two each of the double-member excentric path-joint assemblies forming a two-sided path-joint assembly. This preferred two-sided path-joint assembly includes front booms 170, rear booms 172, and multiple rotatable connectors 152. Such a two-sided path-joint assembly operates in the same manner as the one-sided path-joint assembly previously disclosed, and any description of actuator assemblies or path-joint assemblies herein disclosed can be constructed in a one-sided or two-sided configuration. A path-joint assembly of the present invention is any joining mechanism, or one or more path joints that allows one component of the present invention to move, either circularly, excentrically, or otherwise, about another component of the present invention. A path-joint assembly may include two or more path-joints, that work together to enable one or more components to move about, or in relation to, another component of the present invention. A path joint assembly may also be tensioned to further enhance balance or stability.

FIG. 3 illustrates the dynamic furniture 100 positioned for a user lying down with legs up and back flexed; and FIG. 2 illustrates the dynamic furniture 100 in a position suitable for lounging or sitting. By "flexed" it is meant that the platforms of the dynamic furniture achieve a position greater than one-hundred-eighty degrees, such that if occupied, a user within would occupy a position that curves the body toward the spine. Due to the path joint assemblies of the present invention, embodiments of the present invention are additionally capable of forming both upright and reclining positions. By "upright," it is meant that a user within the furniture would occupy a seated position that curves the body toward the stomach. A "reclining position" of the present invention is a position that places the body in a substantially one-hundred-eighty degree position. The present invention is capable of achieving positions in the upright, reclining, and flexed states.

By using excentric path-joint assemblies, such as those shown in FIGS. 1-3, the actuator assembly 104 is joined to base 102 in a manner that permits the actuator assembly to travel along an excentric orbit relative to the base 102. By excentric orbit, it is meant that an edge of a portion of the actuator forges a path that when continued for a noticeable distance traces out an excentric shape with respect to the base. The path derived from an excentric path-joint assembly is advantageous because it is conducive to sustaining balance, for the user, while the user is remaining static or dynamically changing body positions within the furniture.

Figure 4A:
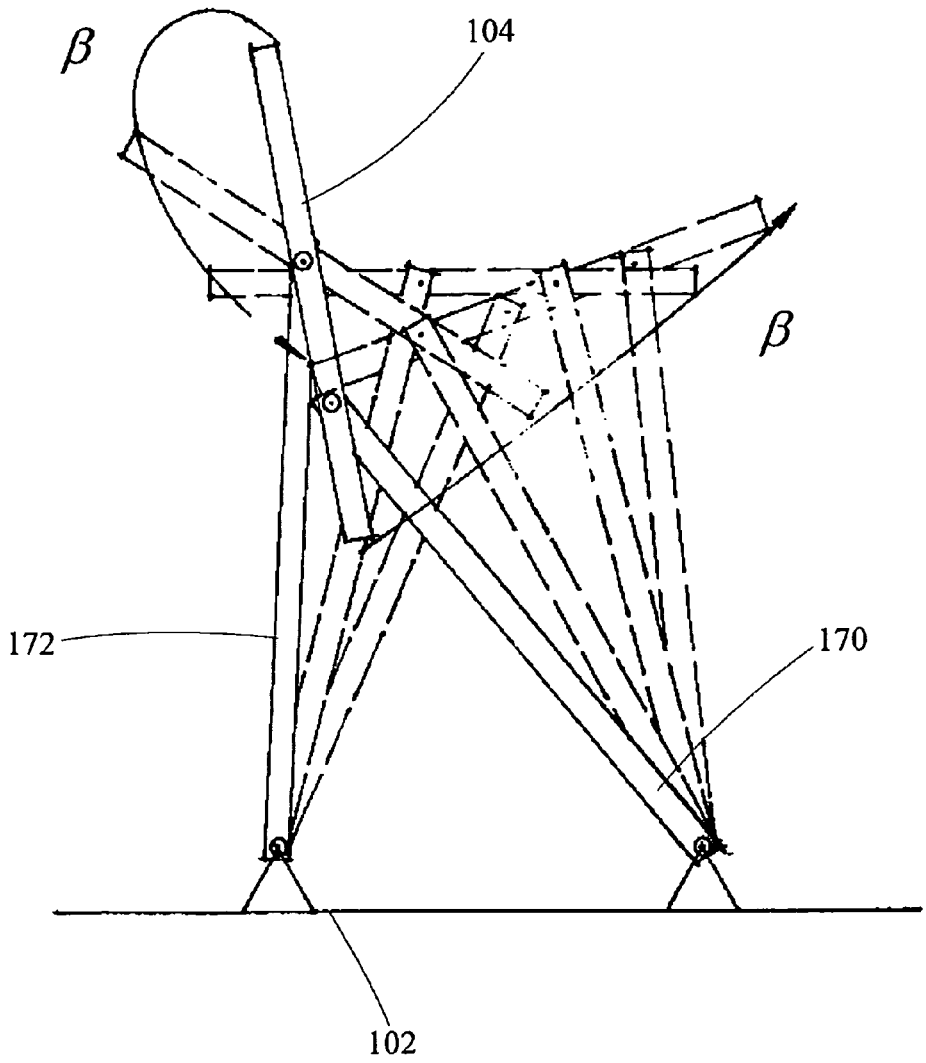
FIG. 4a is a sectional motion diagram of a path-joint assembly dynamically connecting a base to an actuator.

FIG. 4a illustrates the motion of a straight bar actuator assembly 104 that is movably joined to base 102 with a double-boom excentric path joint assembly. The β arrows in FIG. 4a illustrate the dynamic motion of the actuator assembly 104, in relation to base 102, which is permitted by the front boom 170 and rear boom 172 of the double-boom excentric path joint assembly. When the path joint assembly includes double booms as in FIG. 4a, rather than the boom depicted in FIG. 1, then the double booms can also cross each other. A floor-mounted embodiment, for example, works best when the double booms routinely cross each other.

Figure 4B:
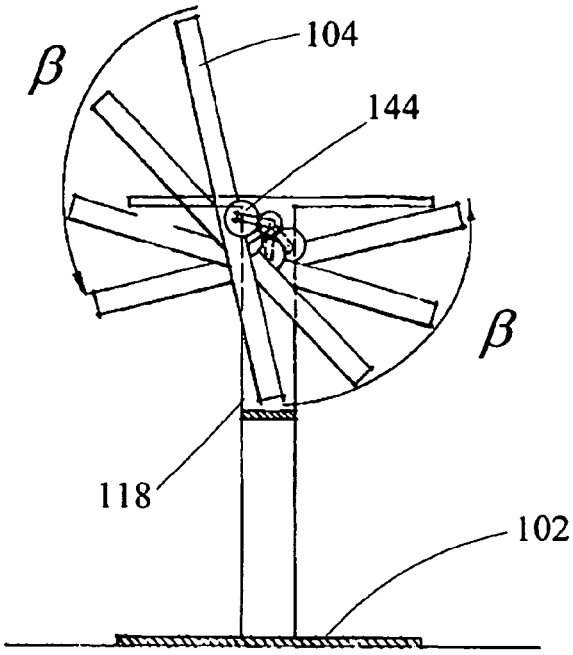
FIG. 4b is a sectional motion diagram of a path-joint assembly dynamically connecting a base to an actuator.
Figure 11:
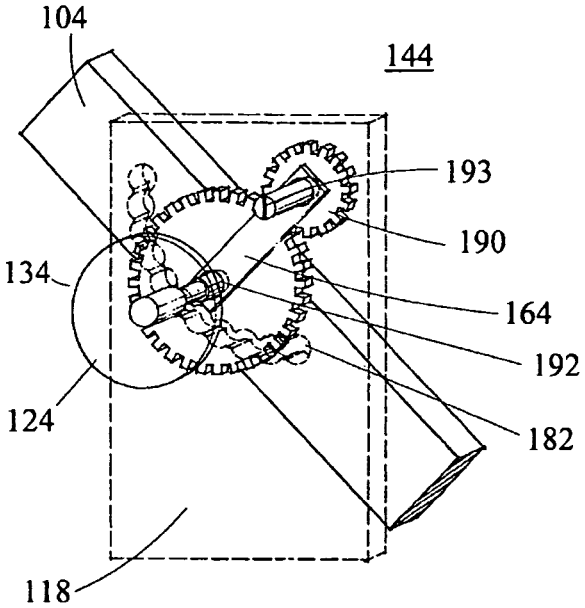
FIG. 11 is a sectional view of components of an embodiment of the dynamic furniture.

An alternate embodiment of an excentric path-joint assembly is illustrated in FIG. 4b. In FIG. 4b, the actuator assembly 104 includes a straight bar, and base 102 includes a fixed base post 118 portion extending upward. A geared excentric path-joint assembly 144 connects the actuator 104 to the base post 118 portion of the base 102. The β arrows in FIG. 4b illustrate the motioning of the actuator assembly 104 that is permitted by this embodiment of the geared excentric path-joint assembly. FIG. 11 shows the geared excentric path-joint assembly 144 in greater detail.

The embodiment of the geared excentric path-joint assembly 144 shown in FIG. 11 comprises a double-hole bar 164 connecting the actuator gear-and-peg 192 to the base gear-and-peg 190. The gear portion of the actuator gear-and-peg 192 is fixably attached to the actuator assembly 104. The gear portion of the base gear-and-peg 190 is fixably attached to the base post 118. The double-hole bar 164 is rotatably connected separately to each of the two pegs and keeps the two gears in mechanical communication so that the path swept out by the actuator assembly 104 is excentric relative to the base post 118. Embodiments of the base post 118 may be directly secured to the floor, ceiling, wall, or a mobile platform.

The geared excentric path-joint 144 assembly depicted in FIG. 11 is preferably controlled by a dynamic-joint controller capable of selective lock and adjust control of the movement of the actuator relative to the base. FIG. 11 also depicts an excentric dynamic-joint controller 134 of the present invention. This actuator control allows a user or attendant to halt the motion of the actuator relative to base post 118. It also allows a user or attendant to adjust the focus of the excentric path of the actuator assembly 104 with respect to base post 118. Such a dynamic-joint controller is shown in FIG. 11 comprising control knob 124 in selective connection to the actuator gear-and-peg 192, and a track 182 located within the base post 118. The actuator gear-and-peg 192 is affixed to the actuator assembly 104, the base gear-and-peg 190 is affixed to the base post 118, and the double-hole bar 164 dynamically holds the mating gears together. Further, engaging control knob 124 locks the actuator assembly 104 to the base post 118. Disengaging the control knob 124 then permits the actuator assembly to again achieve motion in relation to the base post 118. Additionally, when the control knob is disengaged, a screwdriver or other such instrument may be inserted into the slot 193 within the peg portion of the base gear-and-peg 190 in order to adjust the normally fixed position of the base gear-and-peg 190 and reaffix it to base post 118. This adjustment changes the focus of the excentric path of the actuator assembly 104, relative to base post 118, and thus changes the balance and stabilization realized by a seated user for his particular body type.

Returning to FIG. 1, the preferred actuator assembly 104 is shown. The actuator assembly 104 dynamically supports both the rotatably attached seat platform 106 and, similarly, the rotatably attached back platform 108. The preferred embodiment of actuator 104 includes an interior, open space; and the preferred structure for achieving this interior, open space is the illustrated curved plate actuator. The curved plate actuator 104 allows the back platform 108 and the seat platform 106 to achieve angles between each other ranging from less than eight-five degrees to more than one hundred ninety degrees—and those in between. This enables the dynamic furniture 100 to conform to the sitting and lying postures of a user situated there within, as well as other postures in-between and beyond—such as standing up or flexing one's back. This actuator assembly 104 configuration is preferred since it allows a user to easily enter and exit the chair from the front or either side, and it allows a disabled user to enter into the seated position of the dynamic furniture 100 by sliding over from another chair or from a lying position into a bed. Materials suitable for the actuator, as well as other components of the dynamic furniture, include wood, metals, plastics, and composites having sufficient strength to accept component wear, and to hold the weight of an individual in dynamic motion.

Figure 4C:
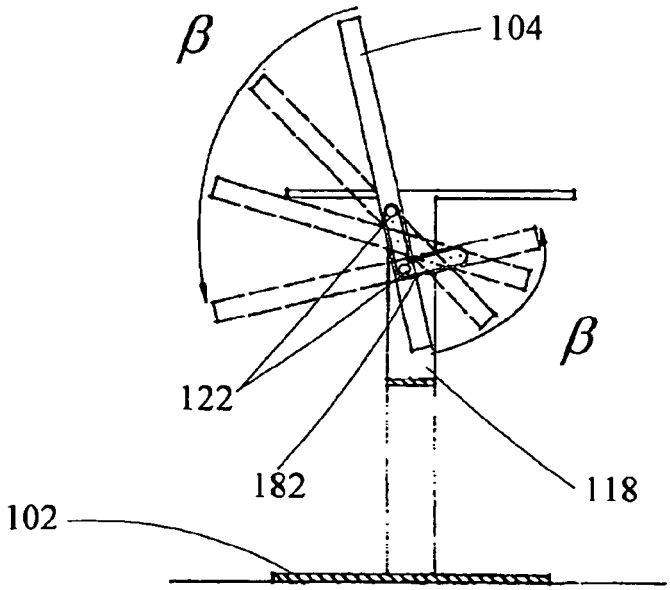
FIG. 4c is a sectional motion diagram of a path-joint assembly dynamically connecting a base to an actuator.
Figure 4D:
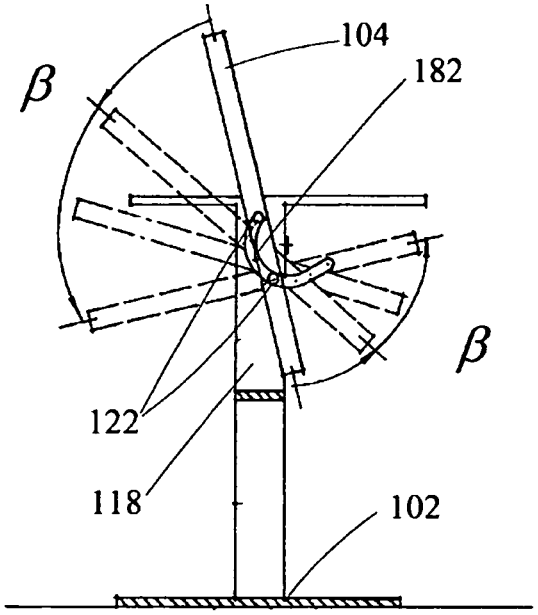
FIG. 4d is a sectional motion diagram of a path-joint assembly dynamically connecting a base to an actuator.

Turning to FIGS. 4c and 4d, the actuator assembly 104 includes a straight bar, and the excentric path-joint assembly includes a base track 182 and double contacts 122. The base track 182 is attached to the base post 118 portion of the base 102. The double contacts 122 are affixed to actuator 104, and these double contacts are permitted only to slide within base track 182. The β arrows in FIG. 4c and FIG. 4d illustrate the movements of the actuators 104 permitted by their respective excentric path-joint assemblies. The base track can be any shape sufficient to promote orbital motion of the actuator relative to the base 102, such as that shown in FIG. 4d in which both circular orbital and excentric orbital motions are allowed by the shape of the base track 182.

Alternatively, other orbital path-joint assemblies may include any other mechanical attachment means suited to enable an orbital path of travel for the actuator 104 relative to base 102.

Figure 5A:
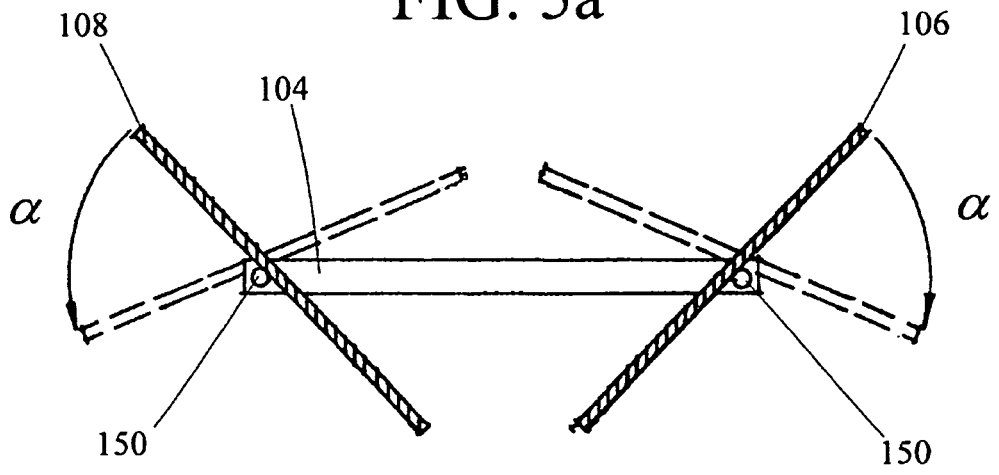
FIG. 5a is a sectional motion diagram of a path-joint assembly dynamically connecting platforms to an actuator.

Examples of embodiments of specific dynamics for seat platforms and back platforms relative to the actuator 104 are as diagrammed in FIG. 5a, FIG. 5b, FIG. 6a, FIG. 6b, FIG. 7a, and FIG. 7b. FIG. 5ashows that the straight bar actuator assembly 104 holds the back platform 108 in orbital circular connection with circular path-joint assembly 150; and straight bar actuator assembly 104 also holds seat platform 106 in orbital circular connection with a circular path-joint assembly 150. The motions of these platforms are illustrated by the α arrows in FIG. 5a.

Figure 5B:
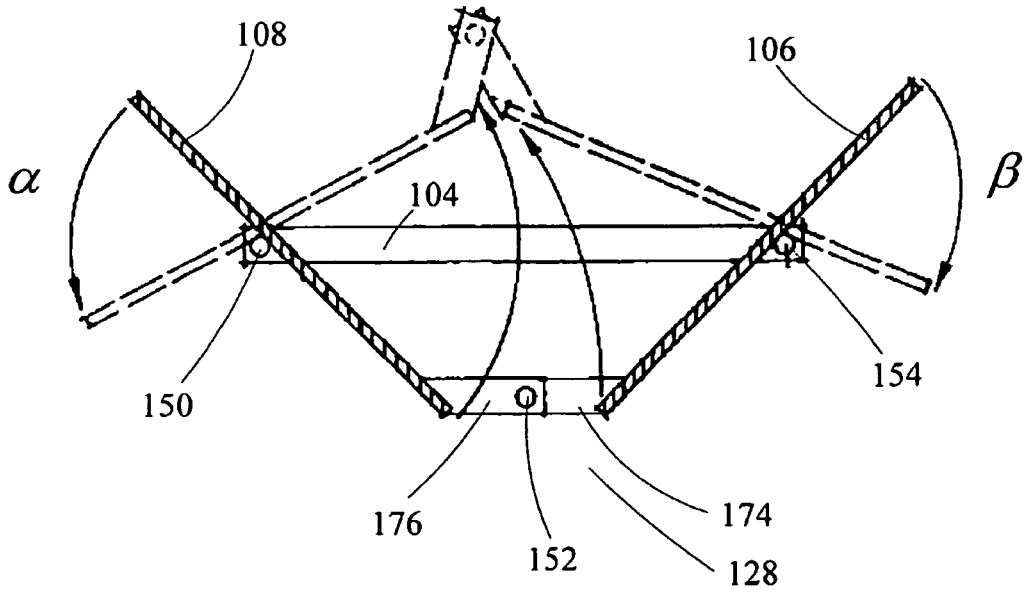
FIG. 5b is a sectional motion diagram of a path-joint assembly dynamically connecting platforms to an actuator.

FIG. 5b shows a roller 154 rotatably connected to actuator 104. FIG. 5b also shows the seat platform 106 joined to actuator assembly 104 by frictional contact with roller 154; and it shows the back platform 108 connected to the straight bar actuator 104 by the circular path-joint assembly 150. The embodiment of the flex-joint 128 shown in FIG. 5b is a one-pivot two-bar structure comprising a rear bar 176 attached to the edge of the back platform 108, a front bar 174 attached to the edge of the seat platform 106, and a rotatable connector 152 that rotatably connects the rear bar 176 to the front bar 174. The flex-joint 128 of the present invention is a joining mechanism between the seat platform 106 and the back platform 108 that ties the motion of the seat platform 106 to that of the back platform 108, and vice versa. When gravity causes seat platform 106 to remain in frictional connection with roller 154, seat platform 106 is constrained to movement along the roller 154. The combination of joints illustrated in FIG. 5b then allows seat platform 106 to move along an excentric path β while back platform 108 moves along a circular path α.

Figure 6A:
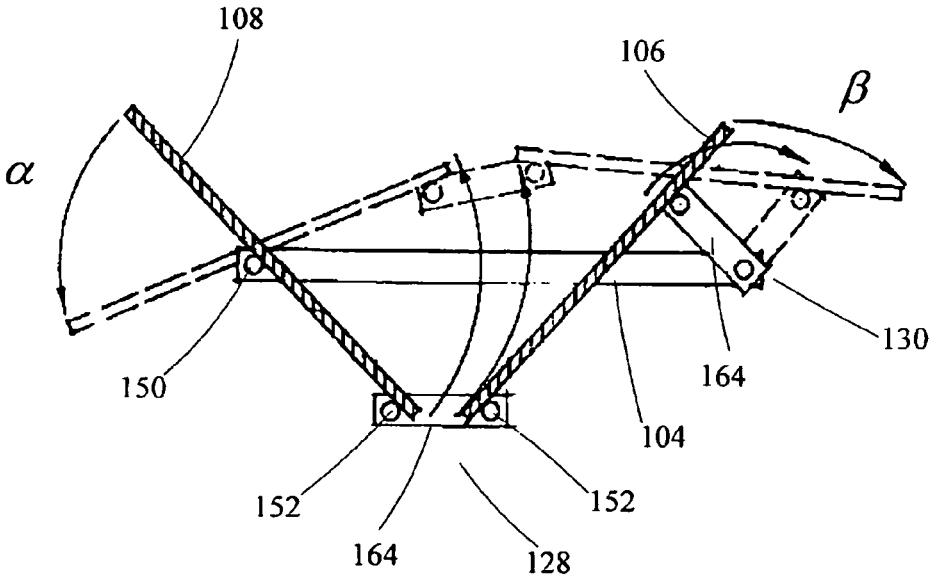
FIG. 6a is a sectional motion diagram of a path-joint assembly dynamically connecting platforms to an actuator.

FIG. 6a shows the straight bar actuator assembly 104, the back platform 108, the seat platform 106, an embodiment of the flex-joint 128 therebetween, and an extended path-joint assembly 130. The flex-joint 128 of FIG. 6a includes a two-pivot one-bar structure having two rotatable connectors 152 and double-hole bar 164. One rotatable connector 152 rotatably connects one end of double-hole bar 164 to the edge of the back platform 108, and the other rotatable connector 152 rotatably connects the other end of double-hole bar 164 to the edge of the seat platform 106. The extended path-joint assembly 130 includes a double-hole bar 164 adapted to project the path of motion for the seat platform 106 either above or below the extended path-joint assembly 130. With the circular path-joint assembly 150 joining the back platform 108 to the actuator 104, the combination of joints illustrated in FIG. 6a allows the seat platform 106 to move along the excentric path β while back platform 108 moves along circular path α.

Figure 6B:
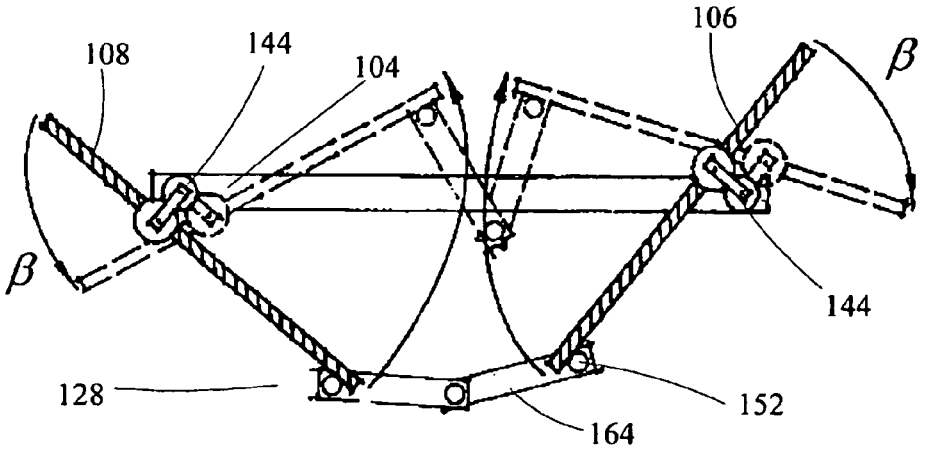
FIG. 6b is a sectional motion diagram of a path-joint assembly dynamically connecting platforms to an actuator.

FIG. 6b shows the back platform 108 attached to the actuator 104 using a geared excentric path-joint assembly 144, and the seat platform 106 attached to the actuator assembly 104 by another geared excentric path-joint assembly 144. These path-joint assemblies enable the seat platform 106 to move along an excentric path β relative to the actuator assembly 104, and back platform 108 to travel along an excentric path β relative to actuator assembly 104. In FIG. 6b, the flex-joint 128, which joins the seat and back platforms together, is comprised of a three-pivot two-bar structure. This preferred embodiment of flex-joint 128 is comprised of two double-hole bars 164 and three rotatable connectors 152: wherein one rotatable connector rotatably connects the two double-hole bars, another rotatable connector rotatably connects the seat platform 106 to the flex-joint 128, and the final rotatable connector rotatably connects the back platform 108 to the flex-joint 128. This arrangement provides a significant amount of stability and flexibility for the user.

Figure 9:
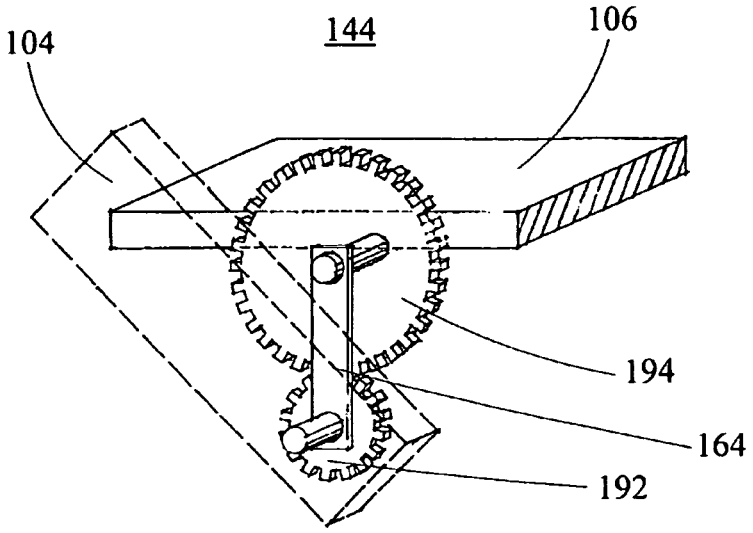
FIG. 9 is a sectional view of components of an embodiment of the dynamic furniture.

FIG. 9 shows an enlargement of the path-joint assembly 144 that is shown in FIG. 6b as connecting actuator 104 with seat platform 106. The seat platform 106 is joined to actuator assembly 104 by the geared excentric path-joint assembly 144 comprising a double-hole bar 164, actuator gear-and-peg 192, and platform gear-and-peg 194. The actuator gear-and-peg 192 is fixably attached to the actuator 104 with the peg protruding, the platform gear-and-peg 194 is fixably attached to the seat platform 106, and the double-hole bar 164 is rotatably attached to each of the two pegs, thus keeping the two gears mechanically engaged. This geared excentric path-joint assembly 144 is capable of maintaining multiple, variable seat platform positions relative to the actuator 104 that can be altered by a user merely by repositioning his or her body position. Since the seat platform 106 is permitted to move only in an excentric path relative to actuator 104, the platform is said to be in excentric connection with the actuator 104.

Figure 7A:
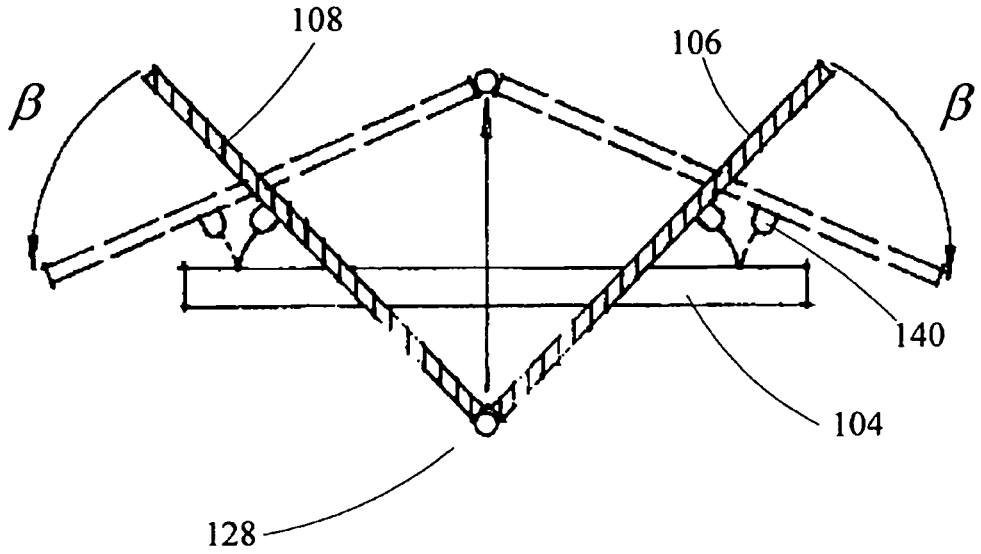
FIG. 7a is a sectional motion diagram of a path-joint assembly dynamically connecting platforms to an actuator.

FIG. 7a shows the actuator assembly 104 with a seat platform 106 in excentric connection. It also shows the actuator 104 in excentric connection with the back platform 108. The seat platform 106 is joined to the actuator assembly 104 by a deformable path-joint assembly 140; and the back platform 108 is joined to the actuator 104 by a deformable path-joint assembly 140. The deformable path-joint assembly 140 may be comprised of a resilient, flexible material that has a natural state of relaxation, can be deformed into various curved positions by the application of force, and will tend to spring back to its natural state of equilibrium. The preferred deformable path-joint assembly is a spring. The flex joint 128 is a rotatable connector. The combination of joints illustrated in FIG. 7a enables seat platform 106 and back platform 108 to move along excentric paths β and β, respectively.

Figure 7B:
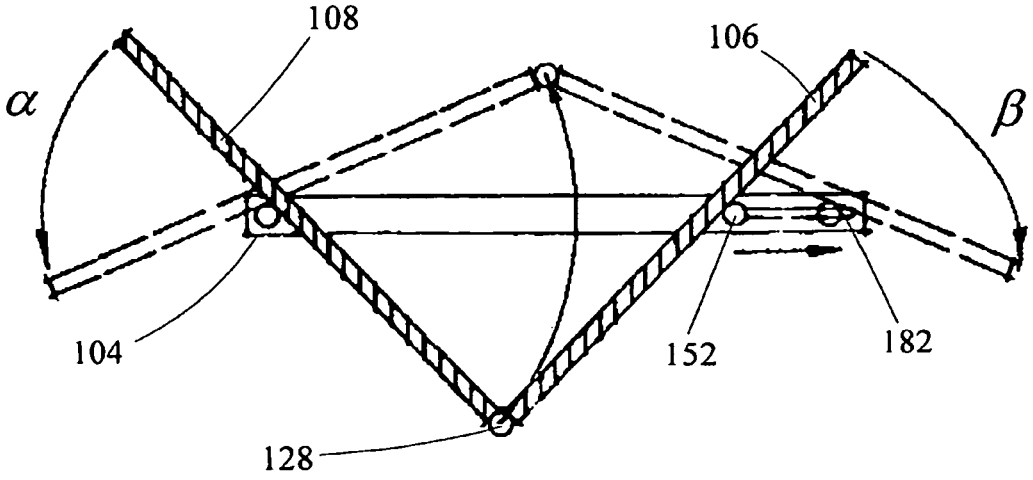
FIG. 7b is a sectional motion diagram of a path-joint assembly dynamically connecting platforms to an actuator.

FIG. 7b shows the back platform 108 rotatably connected to actuator assembly 104, the seat platform 106 joined to the actuator 104 by the path-joint assembly, and the seat platform 106 joined to the back platform 108 by an embodiment of the flex-joint 128 capable of deformation. The deformable flex-joint 128 includes a deformable material that has a natural state of relaxation that can be deformed into one or more positions by the application of force. Preferred deformable flex-joints include a strip of fabric or elastic that is then attached between the back platform 108 and seat platform 106. The path-joint assembly, in FIG. 7b, includes a rotatable connector 152, rotatably attached to the seat platform 106, capable of sliding within track 182. The combination of joints illustrated in s FIG. 7b allows the seat platform 106 to move along an excentric path β while the back platform 108 moves along a fixed circular path α.

Figure 4E:
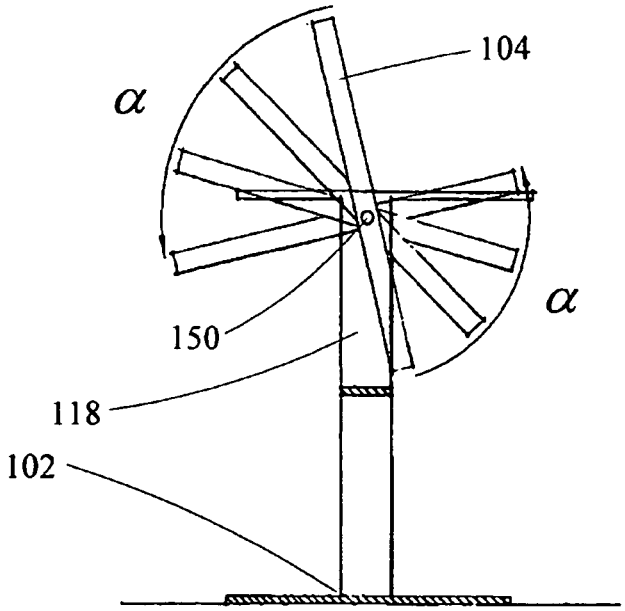
FIG. 4e is a sectional motion diagram of a path-joint assembly dynamically connecting a base to an actuator.
Figure 8:
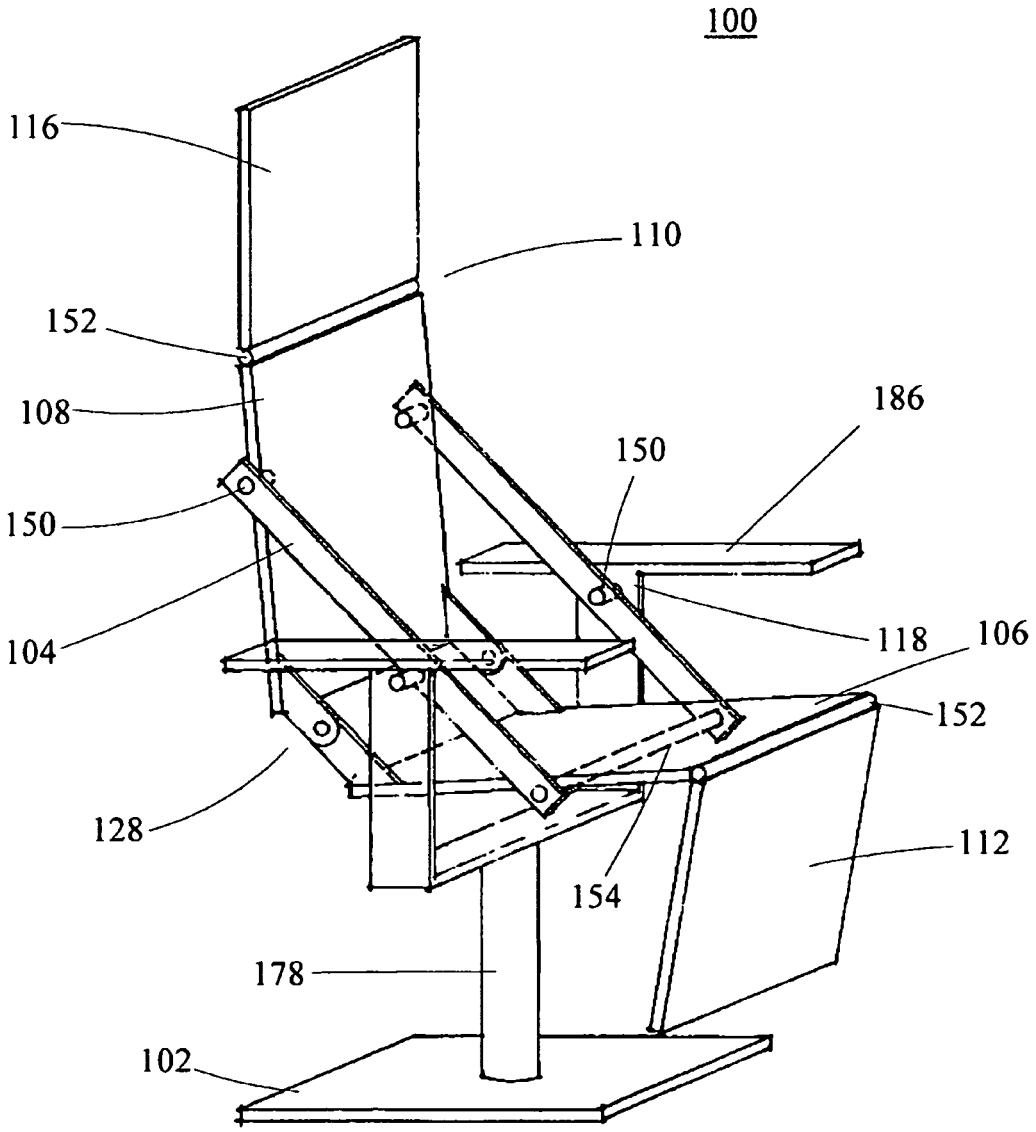
FIG. 8 is a perspective view of an embodiment of the dynamic furniture.

Turning to FIG. 8, an embodiment of the dynamic furniture 100 is shown. This embodiment of the dynamic furniture 100 shows: the base 102 with a rectangular floor contact member; the base post 118 stemming upward from the floor via a telescoping assembly 178, and an armrest 186 attached to the base post 118. The flex-joint 128 joins the back platform 108 and the seat platform 106, and the back platform 108 is rotatably attached to the straight actuator assembly 104 via circular path-joint assembly 150. The seat platform 106 rests on the roller 154, and the circular path-joint assembly 150 connects the actuator assembly 104 to the base post 118 portion of the base 102. The circular path-joint assembly 150 shown between the actuator assembly 104 and the base post 118 is a rotatable connector that allows actuator 104 to tilt back and forth into various positions along a fixed circular path relative to the base post 118. More specifically, the circular path-joint assembly 150 allows the actuator 104 to rotate vertically with respect to the base 102. The motion enabled by the circular path-joint assembly is illustrated by the α arrows in FIG. 4e; and the motions of the seat and back platforms are as diagrammed in FIG. 5b. FIG. 4e shows the base 102, the base post 118 portion of base 102, the actuator assembly 104, circular path-joint assembly 150, and the circular orbital motion that a circular path-joint assembly allows—as shown by the α arrows.

Alternative circular path-joint assemblies, and rotatable connectors, may include a peg turning within a hole, a rod turning within a sleeve, double contacts sliding within a circular track, or any other mechanical attachment means suited to allow a circular path of travel. By circular path of travel, it is meant that an edge of a portion of the actuator assembly 104 forges a path of travel that traces out a circular arc shape with respect to the base 102.

Path-joint assemblies may alternatively include compound path-joints comprising two or more path-joint assemblies configured in series, such as the many types of universal joints which enable curvilinear paths which are not necessarily planar, and may also include spherical path-joint assemblies such as the many types of ball-and-socket or ball-in-socket joints.

The path-joint assembly need not join the base post 118 portion of base 102 to a center portion of the actuator assembly 104, as shown in FIG. 4e; the path-joint assembly need only be affixed to the base 102 in such a manner as to allow a substantial portion of the actuator assembly 104 to protrude and dynamically achieve its function of supporting other moving components of the dynamic furniture 100 such as back, seat, and leg rest platforms.

Returning to FIG. 8, the present invention includes an upper portion 110 that includes back platform 108 with a head rest platform 116 connected by a rotatable connector 152; and the seat platform 106 has a leg rest platform 112 connected by a rotatable connector 152. Other embodiments of the dynamic furniture 100 may, however, include a fixably attached head rest or leg rest platform. Between the back platform 108 and the seat platform 106 is the flex-joint 128, in FIG. 8; and the leg rest platform 112 shown therein may include one or more portions that are independently adjustable to accommodate leg injuries. As the dynamic furniture 100 includes the aspects of both a chair and a cot, the preferred dimensions for the head rest platform 116, the back platform 108, the seat platform 106, the leg rest platform 112, and other platforms are simply that of a panel. Any dimensions for the platforms sculpted or padded to provide further comfort with a user may be applied to the present invention.

Figure 10:
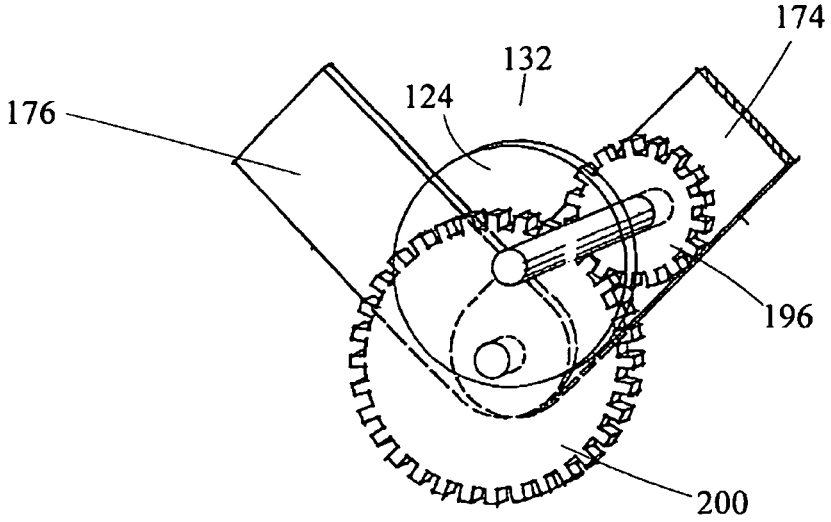
FIG. 10 is a sectional view of components of an embodiment of the dynamic furniture.

FIG. 10 shows a dynamic-joint controller 132. As the present controller is applicable to many components of the present invention, the controller shall be discussed as connecting a generic first component 176 to a generic second component 174. The first component may include the head rest platform 116, back rest platform 108, seat platform 106, or leg rest platform 112. The second component may include the head rest platform 116, back rest platform 108, seat platform 106, or leg rest platform 112—though the first component will differ from the second component. The first component 176 is rotatably connected to the second component 174. The first component 176 and the second component 174 can be put in selective rotational connection by equipping either of the two components with additional parts. Thus equipped, a user can control the angle between the two components or any other furniture components attached thereto. FIG. 10 shows the two components equipped with the additional parts that make it capable of selective lock and adjust control of the angle between them. This preferred embodiment of the dynamic-joint controller includes a slave gear-and-peg 200, control gear-and-peg 196, and control knob 124; and the first component 176 rotatably connected to the second component 174 such that the two gears can be engaged. The gear portion of slave gear-and-peg 200 is affixed to the first component 176, and the control gear-and-peg 196 is rotatably connected to the second component 174. Engaging and then turning the control knob 124 will rotate the first component 176 relative to the second component 174. When the control knob 124 is engaged it can also be used to lock the first and second components together in the then-current position. When the slave and control gears are riot engaged, the first and second components bars are free to rotate, relative to each other. The controller shown in FIG. 10 can be adapted for use on flex-joints and other path-joint assemblies, or rotatable connectors.

Figure 12:
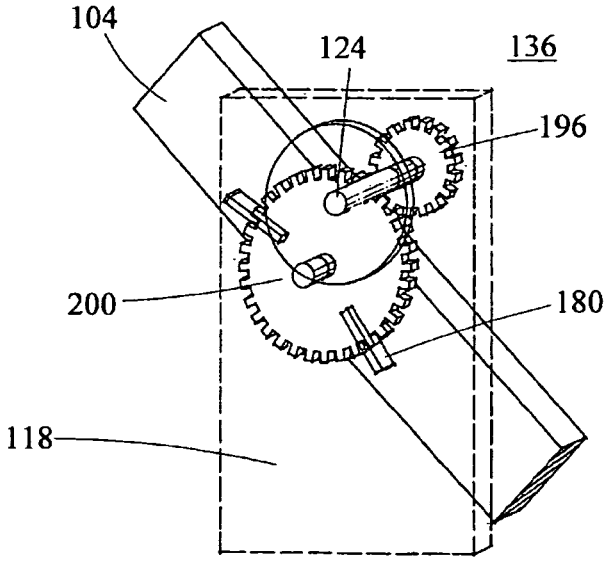
FIG. 12 is a sectional view of components of an embodiment of the dynamic furniture.

For example, FIG. 12 illustrates a circular dynamic-joint controller 136 capable of selective lock and adjust control of the movement of actuator assembly 104 in relation to the base post 118 of the present invention. In FIG. 12, the circular dynamic-joint controller 136 includes the control gear-and-peg 196, which at one side is rotatably connected to base post 118 and at its other side is affixed to control knob 124; and it shows that circular dynamic-joint controller 136 includes slave gear-and-peg 200: the gear portion of which is affixed to the actuator 104, and the peg portion of which is rotatably attached to the base post 118.

The slave gear-and-peg 200 may also include stops 180 to limit dynamic motioning of the actuator assembly 104, when needed, to an acceptable range for a specific user. In the preferred embodiment of the circular dynamic-joint controller 136, as depicted in FIG. 12, the control knob 124 can be pushed in to engage the gear portion of control gear-and-peg 196 with the gear portion of slave gear-and-peg 200. When engaged, turning the control gear-and-peg 196 via the control knob 124 will rotate the actuator assembly 104 relative to the base post 118. When the control knob 124 is engaged it can be used to lock the actuator 104 relative to the base post 118. When engaged or disengaged, movement of actuator 104 is limited by stops 180.

Figure 13:
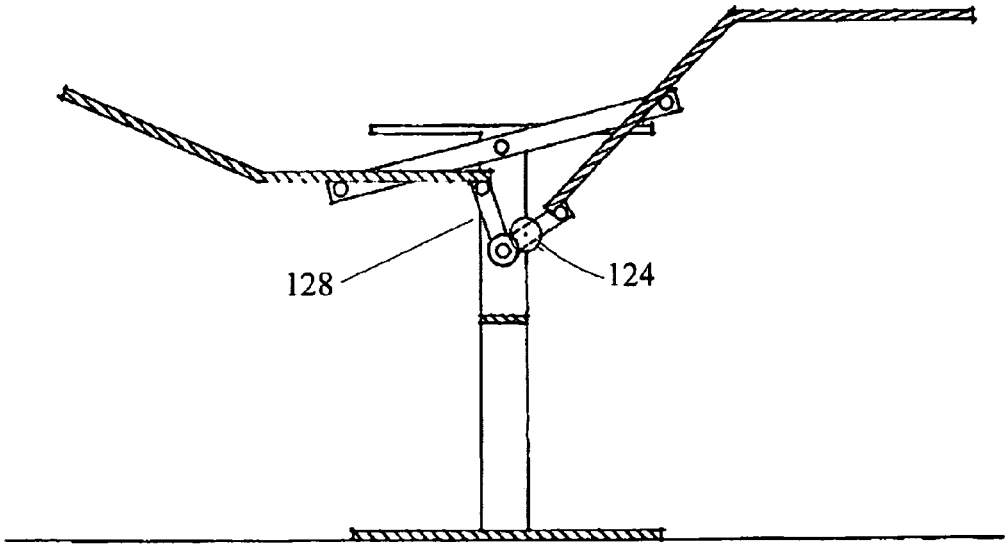
FIG. 13 is a sectional view of an embodiment of components of the dynamic furniture.
Figure 14:
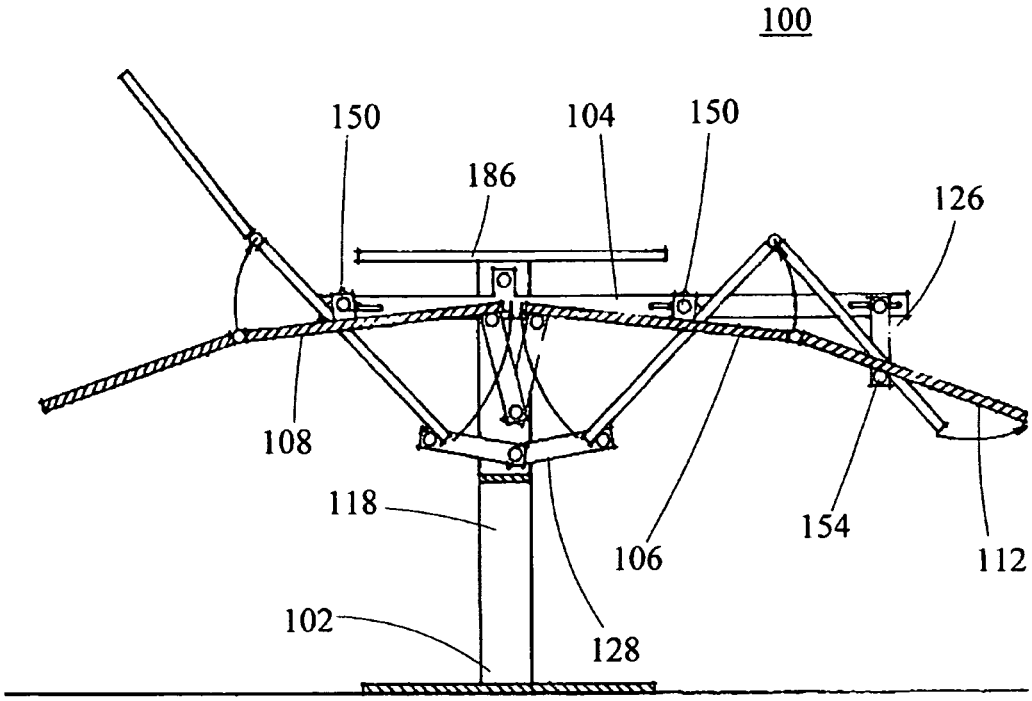
FIG. 14 is a sectional view of an embodiment of the dynamic furniture.

The flex-joint 128 of the embodiment in FIG. 13 includes a dynamic-joint controller capable of selective lock and adjust control, of the movement of the two platforms relative to each other, via rotation of control knob 124. A preferred embodiment of this controller is shown in more detail in FIG. 10. Other dynamic-joint controllers available to the trade, and capable of fulfilling the advantages of the present invention, are also acceptable. Turning to FIG. 14, the dynamic furniture 100 includes the actuator assembly 104 attached to the base post 118 portion of base 102; and the dynamic furniture also includes the seat platform 106 and the back platform 108, each rotatably connected to the actuator 104 by one or more circular path-joint assemblies 150. The seat platform 106 is rotatably connected to the actuator assembly 104 in a proximate position; and the back platform 108 is rotatably connected to the actuator 104 in a distal position. The terms 'proximate position' and 'distal position' as they relate to the actuator assembly 104 are purely for the purpose of explaining the attachment locations of the back platform 108 and seat platform 106. If the actuator 104 is divided into two portions separated by an imaginary middle point, then proximate is meant merely to refer to one portion of the actuator assembly 104, and distal is merely meant to refer to the other portion of the actuator assembly 104.

In the dynamic furniture 100 embodiment in FIG. 14, the flex-joint 128 joins the back platform 108 to the seat platform 106. As FIG. 14 also shows, embodiments of the present invention might further include a leg rest platform guide 126. The preferred leg rest platform guide 126 of the present invention includes a roller 154 attached to actuator assembly 104 that serves to restrict the rotation of the leg rest platform 112 in relation to seat platform 106. The purpose of the leg rest platform guide 126 is to hold the leg rest platform 112 in a position that comfortably supports a user's legs in various positions of repose and throughout the range of motions involved in changing from lying flat to other positions. The preferred structure of the leg rest platform guide 126 includes roller 154 rotatably connected to actuator 104. Gravity ensures the leg rest platform 112 remains in contact with the roller 154 during use; and because this preferred leg rest platform guide 126 is connected to the actuator 104, the leg rest platform 112 will effectively adjust to the user as the user moves between positions, such as between a lying and a sitting position. For example, the leg rest platform guide 126 ensures that in a lying position, embodiments possessing the leg rest platform guide 126 have a leg rest platform 112 that contacts the legs of the user in a manner substantially planar with the seat platform 106; and while progressing to a sitting position, the leg rest platform guide 126 ensures that the users legs will be supported while they progressively bend to ninety degrees or less. The embodiment shown in FIG. 14 also includes arm rest 186, to facilitate moving ones body while within the dynamic furniture.

Figure 15:
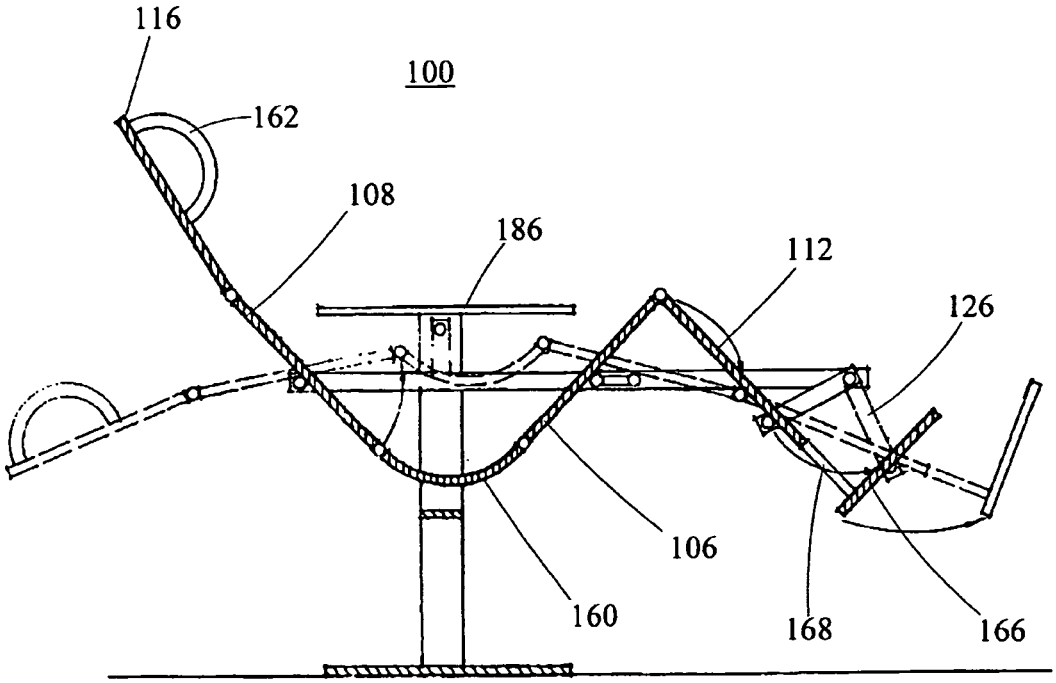
FIG. 15 is a sectional view of an embodiment of the dynamic furniture.

As shown in FIG. 15, an embodiment of the dynamic furniture 100 might further include a butt platform 160 positioned between the seat platform 106 and the back platform 108. The preferred version of the butt platform 160 is a curved panel rotatably connected at two ends of its periphery. At one end it is rotatably connected to the seat platform 106; and at its opposite end it is rotatably connected to the back platform 108. In this preferred embodiment, portions of the butt platform 160 are capable of rotation to positions both above and below the platforms to which it is connected. The embodiment shown in FIG. 15 also includes: arm rest 186; head rest platform 116 with handle 162; and rotatably attached leg rest platform guide 126, as well as the leg rest platform 112 equipped with foot rest platforms 166 and foot rest adjusters 168 to further support a seated patient.

As shown in FIG. 14 and FIG. 15, platforms connected to the actuator need not be connected to the extreme ends of the actuator; and a portion of the actuator can be extended to provide guidance and support for additional platforms attached thereto.

Figure 16A:
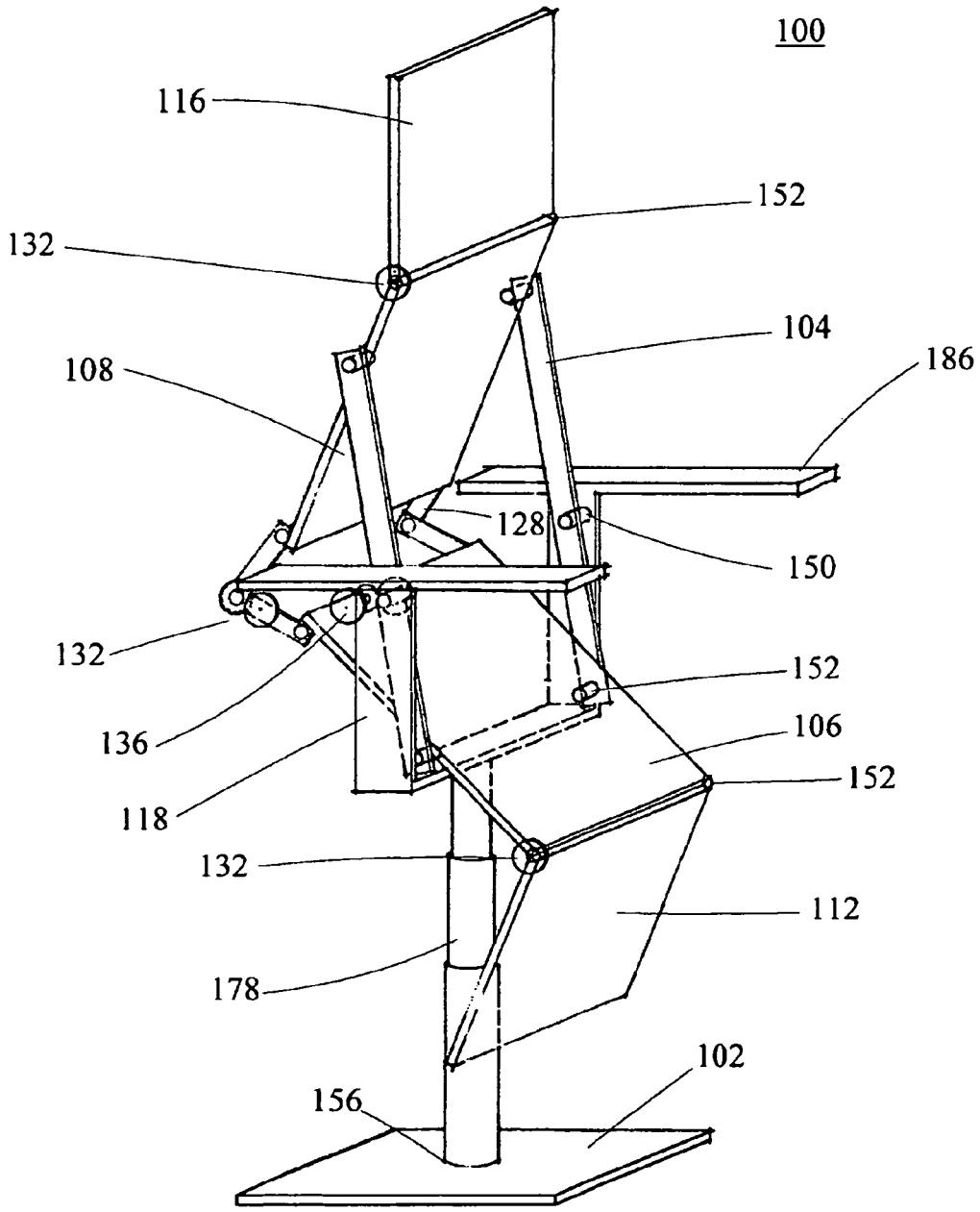
FIG. 16a is a perspective view of an embodiment of the dynamic furniture.
Figure 16B:
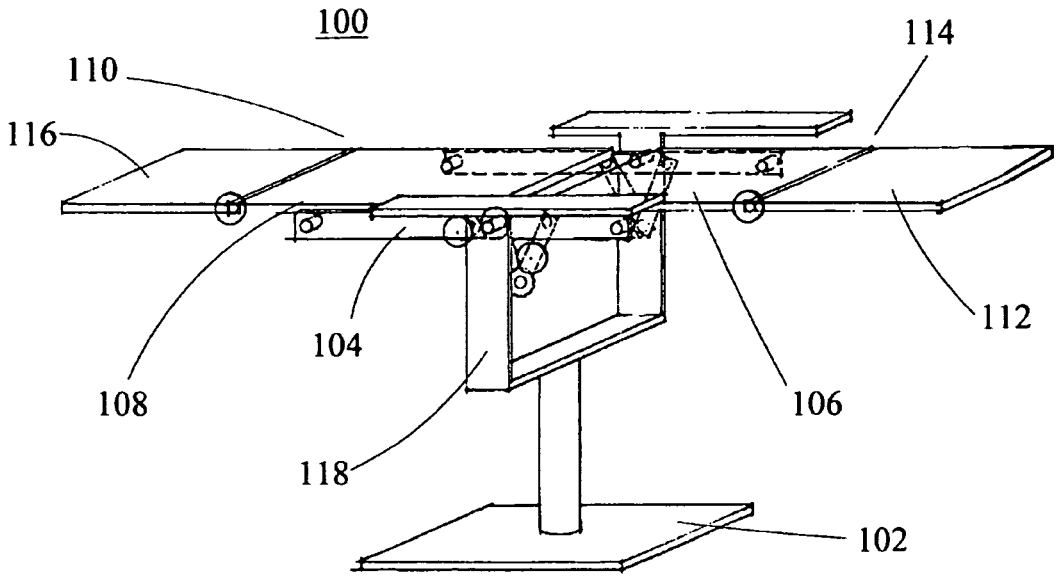
FIG. 16b is a perspective view of an embodiment of the dynamic furniture.
Figure 16C:
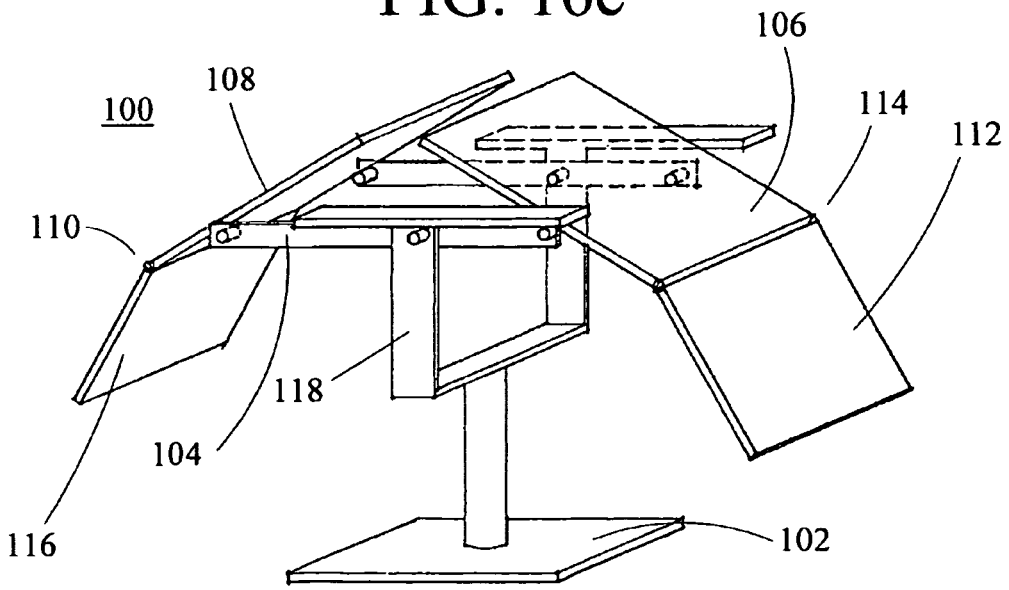
FIG. 16c is a perspective view of an embodiment of the dynamic furniture.

The flexibility of the dynamic furniture 100 allows it to be utilized for many, various purposes related to transportation, relaxation, repose, and examination. Turning to FIGS. 16a, 16b, and 16c, an embodiment of the dynamic furniture 100 is shown to include additions and features that allow the present invention to include aspects of a chair, bed, lift chair, and body repositioning device in a single apparatus. FIG. 16a shows the actuator 104 connected to base post 118 by the circular path-joint assembly 150 which includes circular dynamic-joint controller 136. The seat platform 106 is connected to the actuator 104 by the rotatable connector 152; and seat platform 106 is connected to the leg rest platform 112 by the rotatable connector 152 which includes a dynamic-joint controller 132. FIG. 16a also shows the back platform 108 connected to the actuator assembly 104 by the rotatable connector 152, and the back platform 108 is connected to the head rest platform 116 by the rotatable connector 152 which includes the dynamic-joint controller 132. The seat and back platforms are connected together by two of the flex-joints 128 of which one includes the dynamic-joint controller 132.

FIG. 16a shows the furniture 100 configured to assist the user in standing up. FIG. 16b shows the furniture 100 configured for sleeping. FIG. 16c shows the furniture flexed beyond horizontal.

The dynamic furniture 100 embodiment depicted herein may include a wheel assembly having multiple wheels affixed to the base 102. Features which are further advantageous to the present invention include the telescoping assembly 178 pictured in FIG. 16a. The telescoping assembly 178 provides the capability of the dynamic furniture to be raised and lowered. Other means within the trade for accomplishing the elevation adjustment are acceptable. Conjunctively, the base 202 further includes swivel 156 comprising a rotatable member that allows one portion of the base to rotate upon another portion of the base. The illustrated embodiment further includes armrests 186 affixed to the base posts 118. Any convenience feature common in the furniture art, particularly padding, or power-assisted mobility and adjustability, may be included in the present invention, as important aspects of the present invention include comfort and service.

What is claimed is:

1. Dynamic furniture for supporting a seated or reclining user, said furniture comprising:

a base;

an actuator assembly consisting of two elongate, parallel members, each member having a proximate portion and a distal portion, wherein said actuator is in excentric, restrained, and substantially centralized orbital connection to said base between said proximate portions and distal portions of said members;

a seat platform, in orbital, restrained, and single connection to said proximate portion of said actuator assembly and disposed at least partially within said parallel members; and a back platform, in orbital, restrained, and single connection to said [proximate] *distal* portion of said actuator assembly and disposed at least partially within said parallel members, and wherein said seat platform is capable of rotation about said seat platform orbital connection without displacing said back platform, wherein said back platform is capable of rotation about said back platform orbital connection without displacing said seat platform, wherein vertical displacement of said seat platform proximate to said seat platform orbital connection displaces said actuator to further displace said back platform, and wherein vertical displacement of said back platform proximate to said back platform orbital connection displaces said actuator to further displace said seat platform.

2. The dynamic furniture of claim 1 whereby said seat platform and said back platform comprise orbital connections dimensioned to allow said seat platform and said back platform to selectively pass through a substantially planar orientation to achieve positions including an upright position, a reclining position, and a flexing position.

3. The dynamic furniture of claim 2 wherein said seat platform is in excentric orbital connection to said proximate portion of said actuator assembly.

4. The dynamic furniture of claim 3 wherein said back platform is in excentric orbital connection to said distal portion of said actuator assembly.

5. The dynamic furniture of claim 3 wherein said back platform is in circular orbital connection to said distal portion of said actuator assembly.

6. The dynamic furniture of claim 2 wherein said seat platform is in circular orbital connection to said proximate portion of said actuator assembly.

7. The dynamic furniture of claim 6 wherein said back platform is in circular orbital connection to said distal portion of said actuator assembly.

8. The dynamic furniture of claim 6 wherein said back platform is in excentric orbital connection to said distal portion of said actuator assembly.

* * * * *